M. D. FRANEY.
WRIST PIN FASTENING.
APPLICATION FILED OCT. 21, 1912.
1,139,962. Patented May 18, 1915.
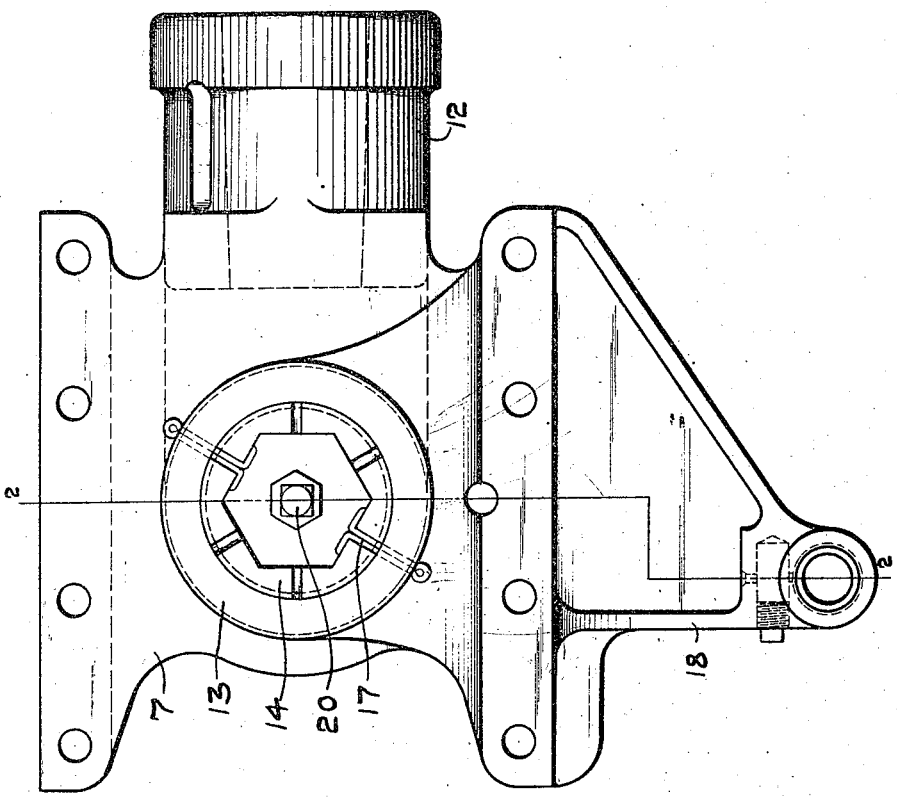
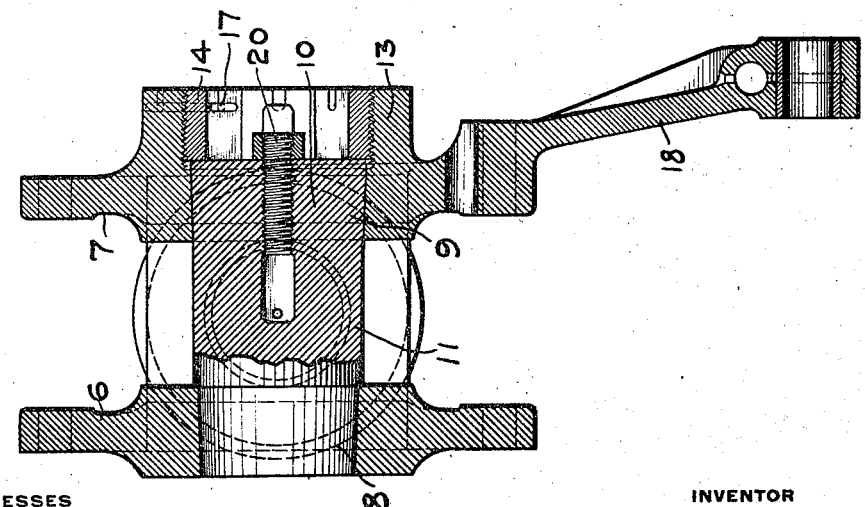
WITNESSES
INVENTOR
Michael D. Franey
by Edward A. Wright
Atty

UNITED STATES PATENT OFFICE.

MICHAEL D. FRANEY, OF CLEVELAND, OHIO.

WRIST-PIN FASTENING.

1,139,962.  Specification of Letters Patent.  Patented May 18, 1915.

Application filed October 21, 1912. Serial No. 726,915.

*To all whom it may concern:*

Be it known that I, MICHAEL D. FRANEY, a citizen of the United States, residing at Cleveland, in the county of Cuyahoga and State of Ohio, have invented a certain new and useful Improvement in Wrist-Pin Fastenings, of which improvement the following is a specification.

This invention relates to means for fastening wrist pins in cross heads, coupling rods, or other members, and is more particularly designed for use upon locomotives.

The principal object of my invention is to provide an improved wrist pin connection in which the pin may be applied by inserting the same into an opening tapering toward the back or inside of the head, and forcing the pin into said opening by a screw clamping device mounted on the outer side of the head.

In the accompanying drawings: Figure 1 is a side elevation of a locomotive cross head embodying one form of my improvement; and Fig. 2, transverse section taken on the line 2—2 of Fig. 1.

As shown in the drawing, the cross head is constructed with the usual piston rod socket portion, 12, outer wall, 7, and inner wall, 6, to which the ordinary shoes are adapted to be bolted, and the bracket, 18, having a bearing for a pivoted arm of the valve gear.

In the outer and inner walls of the head are formed openings or sockets tapering toward the inner side of the head for receiving the corresponding tapered portions, 8 and 9, of the wrist pin, 10; which also has a cylindrical portion, 11, between the tapered portions, and forming a bearing for the main connecting rod.

The tapered opening in the outer wall is larger than that of the inner wall and the cylindrical bearing portion of the pin, so that the pin may be inserted from the outer side into said openings and then be forced into the same by means of the screw clamping device mounted on the outer side of the wall. This screw clamp may be formed in various ways, but as shown in the drawing, it comprises a cylindrical boss or flange, 13, projecting from the outer face of the wall, 7, around the tapered pin opening and having a threaded opening for receiving the clamp screw or nut, 14, which bears against the outer end of the wrist pin and forces the same into the tapered sockets. The nut may be designed to be engaged by any suitable tool or wrench for turning the same, but it is preferably made hollow, as shown, having a hexagonal or other suitably shaped recess for receiving the wrench. Cotter pins, 17, may be provided for locking the nut, 14, in any given position and preventing the same from working loose.

For the purpose of lubricating, the rod bearing the pin may have the usual drilled holes and grease plug, 20, screwed into the end of the wrist pin, and the threaded connection for this grease plug may also serve as a screw bolt connection for drawing out the wrist pin when it is desired to remove the same from the head.

While I have shown but one form of my improvement as applied to a cross head, it will be evident that various forms of screw clamping devices may be employed for forcing the wrist pin into its sockets from the outer side of the head, and that the same may also be applied to side rods, plates, or other supporting walls where it is desired to mount a wrist pin.

It will now be seen that I have provided a simple, compact, and durable connection for securely fastening the wrist pin in position, also one which is readily accessible at all times for adjusting or removing the pin by simply unscrewing the clamping nut whenever it is desired to take down the rod connection.

Having now described my invention, what I claim as new and desire to secure by Letters Patent is:—

1. In a wrist pin connection, the combination with a supporting wall having a tapered socket opening, and a hollow internally threaded boss around said opening and projecting outward from the face of said wall, of a wrist pin having a tapered portion fitting said socket, and a threaded nut mounted in said boss and bearing against the face of said pin for forcing the same into said socket.

2. In a wrist pin connection, the combination with a supporting wall having a tapered socket opening, and a hollow internally threaded boss around said opening and projecting outward from the face of said wall, of a wrist pin having a tapered portion fitting said socket, a hollow threaded nut mounted within said boss and bearing against the face of said pin, and radial cotter pins extending through said nut and boss.

MICHAEL D. FRANEY.

Witnesses:
 JOSEPH CHIDLEY,
 J. F. DEEMS.